(12) United States Patent
Nakagawa et al.

(10) Patent No.: US 12,394,196 B2
(45) Date of Patent: Aug. 19, 2025

(54) OBJECT RECOGNITION DEVICE

(71) Applicant: SUBARU CORPORATION, Tokyo (JP)

(72) Inventors: Ryo Nakagawa, Tokyo (JP); Kazuya Kozono, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 387 days.

(21) Appl. No.: 18/068,143

(22) Filed: Dec. 19, 2022

(65) Prior Publication Data

US 2023/0230370 A1 Jul. 20, 2023

(30) Foreign Application Priority Data

Jan. 20, 2022 (JP) ................. 2022-007410

(51) Int. Cl.
*G06V 10/98* (2022.01)
*G01S 7/41* (2006.01)
*G01S 13/86* (2006.01)
*G01S 13/931* (2020.01)
*G06V 20/58* (2022.01)

(52) U.S. Cl.
CPC ............ *G06V 10/993* (2022.01); *G01S 7/412* (2013.01); *G06V 20/58* (2022.01)

(58) Field of Classification Search
CPC ...... G06V 10/993; G06V 20/58; G01S 7/412; G01S 7/41; G01S 2013/9319; G01S 2013/9321; G01S 2013/93271; G01S 2013/93272; G01S 2013/93274; G01S 13/726; G01S 13/87; G01S 13/931; G01S 13/867

See application file for complete search history.

(56) References Cited

U.S. PATENT DOCUMENTS

| | | | | | |
|---|---|---|---|---|---|
| 9,354,299 | B2 * | 5/2016 | Ishimori | ............... | G01S 13/345 |
| 9,500,748 | B2 * | 11/2016 | Noda | .................... | G01S 13/867 |
| 9,874,627 | B2 * | 1/2018 | Shimizu | ................ | G01S 13/583 |
| 2023/0080655 | A1 * | 3/2023 | Yomo | .................... | G01S 13/89 342/450 |
| 2023/0128234 | A1 * | 4/2023 | Okabe | .................... | G01S 13/08 701/301 |

FOREIGN PATENT DOCUMENTS

| | | | | | |
|---|---|---|---|---|---|
| JP | | 3960228 B2 * | 8/2007 | ............ | G01S 7/536 |
| JP | | 2009186277 A * | 8/2009 | | |

\* cited by examiner

*Primary Examiner* — Bobbak Safaipour
*Assistant Examiner* — Joshua Chen
(74) *Attorney, Agent, or Firm* — Rimon P.C.

(57) ABSTRACT

An object recognition device is configured to perform object recognition based on information from a unit configured to detect an object image in each frame based on a reflected signal of a transmission signal and configured to calculate one or more patterns of a confidence degree regarding the object image detected according to one or more preset calculation methods. The object recognition device includes: a first evaluation value calculator configured to increase a count of a first evaluation value indicating a probability that the object image is a real image based on the one or more patterns of the confidence degree; and a real image determiner configured to determine that the object image is a real image when a cumulative count of the first evaluation value exceeds a comparative value.

14 Claims, 14 Drawing Sheets

FIG. 7

| FRAME NUMBER | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 |
|---|---|---|---|---|---|---|---|---|---|---|---|---|---|---|---|---|---|---|---|---|---|---|---|---|---|---|---|---|---|---|---|---|---|---|---|---|---|---|---|---|
| GOOD COUNT | | | | | | | | | | 1 | | | 1 | 1 | 1 | 1 | 1 | 1 | 1 | | 1 | 1 | 1 | 1 | 1 | 1 | 1 | 1 | 1 | 1 | 1 | 1 | 1 | 1 | 1 | 1 | 1 | 1 | 1 | 1 |
| BAD COUNT | 2 | 2 | | 1 | | 1 | | 2 | 2 | | | 1 | | | | | | | | 1 | | | | | | | | | | | | | | | | | | | | |
| FIRST EVALUATION VALUE | 0 | 0 | 0 | 0 | 0 | 0 | 0 | 0 | 0 | 1 | 1 | 1 | 1 | 2 | 3 | 4 | 5 | 5 | 5 | 5 | 5 | 6 | 7 | 8 | 9 | 10 | 11 | 12 | 13 | 14 | 15 | 16 | 17 | 18 | 19 | 20 | 21 | 22 | 23 | 24 |
| SECOND EVALUATION VALUE | 2 | 4 | 4 | 5 | 5 | 6 | 6 | 8 | 10 | 11 | 12 | 12 | 12 | 12 | 12 | 13 | 13 | 14 | 15 | 15 | 15 | 15 | 15 | 15 | 15 | 15 | 15 | 15 | 15 | 15 | 15 | 15 | 15 | 15 | 15 | 15 | 15 | 15 | 15 | 15 | t+n ; t+n+m

FIG. 12

| FRAME NUMBER | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 |
|---|---|---|---|---|---|---|---|---|---|---|---|---|---|---|---|---|---|---|---|---|---|---|---|---|---|---|---|---|---|---|---|---|---|---|---|---|---|---|---|---|
| GOOD COUNT | 1 |  | 1 | 1 | 1 |  | 1 |  |  | 1 |  |  | 1 | 1 | 1 | 1 | 1 | 1 | 1 |  | 1 | 1 | 1 | 1 | 1 | 1 | 1 | 1 | 1 | 1 | 1 | 1 | 1 | 1 | 1 | 1 | 1 | 1 | 1 | 1 |
| BAD COUNT |  | 1 |  |  |  | 1 |  | 1 | 1 |  | 1 | 1 |  |  |  |  |  |  |  | 1 |  |  |  |  |  |  |  |  |  |  |  |  |  |  |  |  |  |  |  |  |
| FIRST EVALUATION VALUE | 0 | 0 | 1 | 1 | 2 | 2 | 3 | 3 | 3 | 4 | 4 | 4 | 5 | 6 | 7 | 8 | 9 | 10 | 11 | 10 | 11 | 12 | 13 | 14 | 15 | 16 | 17 | 18 | 19 | 20 | 21 | 22 | 23 | 24 | 25 | 26 | 27 | 28 | 29 |
| SECOND EVALUATION VALUE | 1 | 2 | 2 | 3 | 3 | 4 | 4 | 5 | 6 | 7 | 8 | 8 | 8 | 8 | 8 | 8 | 9 | 10 | 11 | 11 | 11 | 11 | 11 | 11 | 11 | 11 | 11 | 11 | 11 | 11 | 11 | 11 | 11 | 11 | 11 | 11 | 11 | 11 | 11 | t+n ← (at frame position 19/20)
t+n+m ← (at frame position 30/31)

FIG. 13

| FRAME NUMBER | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 |
|---|---|---|---|---|---|---|---|---|---|---|---|---|---|---|---|---|---|---|---|---|---|---|---|---|---|---|---|---|---|---|---|---|---|---|---|---|---|---|---|---|
| GOOD COUNT | | 1 | 1 | 1 | 1 | 1 | 1 | | | | 1 | 1 | 1 | 1 | 1 | 1 | 1 | 1 | 1 | 1 | | 1 | 1 | 1 | 1 | 1 | 1 | 1 | 1 | 1 | 1 | 1 | 1 | 1 | 1 | 1 | 1 | 1 | 1 | 1 |
| BAD COUNT | 2 | 2 | | | | | | 2 | 2 | 2 | | | | | | | | | | | 1 | | | | | | | | | | | | | | | | | | | |
| FIRST EVALUATION VALUE | 0 | 0 | 1 | 1 | 2 | 2 | 3 | 3 | 3 | 4 | 4 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
| SECOND EVALUATION VALUE | 2 | 4 | 4 | 5 | 5 | 6 | 6 | 8 | 10 | 11 | 12 | 12 | 12 | 12 | 12 | 12 | 13 | 14 | 15 | 15 | 15 | 15 | 15 | 15 | 15 | 15 | 15 | 15 | 15 | 15 | 15 | 15 | 15 | 15 | 15 | 15 | 15 | 15 | t+n, t+n+m

OBJECT RECOGNITION DEVICE

CROSS-REFERENCE TO RELATED APPLICATIONS

The present application claims priority from Japanese Patent Application No. 2022-007410 filed on Jan. 20, 2022, the entire contents of which are hereby incorporated by reference.

BACKGROUND

The present disclosure relates to an object recognition device configured to recognize, on the basis of a reflected signal of a transmission signal irradiating a space, whether a detected object image is a real image or a virtual image.

In the related art, driver assistance devices for assisting the driver with driving maneuvers are being implemented in vehicle such as automobiles to reduce the driver burden in performing driving maneuvers and to also achieve improved safety.

Various technologies for performing emergency collision avoidance control with respect to obstacles (objects) such as vehicles ahead of the vehicle in the path of travel and pedestrians entering the path of travel of the vehicle have been proposed as technologies related to active safety for this type of driver assistance device.

In such emergency collision avoidance control, radar systems such as millimeter-wave radar and laser radar are widely used as sensors for detecting obstacles such as vehicles ahead and pedestrians. Object detection using radar can secure ample detection distance while also being less influenced by weather conditions and the like. On the other hand, object detection using radar tends to produce false positives of virtual images (ghosts) due to what is referred to as multipath propagation and the like.

For this reason, many technologies have been proposed for recognizing real images while excluding virtual images from among objects detected using radar. For example, Japanese Unexamined Patent Application Publication (JP-A) No. 2009-186277 discloses a technology in which two object images selected as objects to be determined are given. The object image with a longer relative distance to a vehicle is determined to have a high probability (low confidence) of being a virtual image compared to the object image with the shorter relative distance to the vehicle. JP-A No. 2009-186277 also discloses a technology in which an object image with a weak received signal strength of a reflected signal is determined to have a high probability (low confidence) of being a virtual image compared to an object image with a strong received signal strength.

Furthermore, in this type of object recognition, a technology is known in which an evaluation value for an object image is cumulatively updated every time the same object is detected over multiple frames. The object image is recognized as being a real image or not on the basis of the updated evaluation value. Cumulative counts of the number of times an object image is determined to be of high confidence and the number of times the object image is determined to be of low confidence are typically used as evaluation values for the object image, for example. If the cumulative count of the number of times a high confidence is determined exceeds the cumulative count of the number of times a low confidence is determined, the object image is recognized as being a real image.

SUMMARY

An aspect of the disclosure provides an object recognition device configured to perform object recognition based on information from a unit configured to detect an object image in each frame based on a reflected signal of a transmission signal and configured to calculate one or more patterns of a confidence degree regarding the object image detected according to one or more preset calculation methods, the object recognition device comprising: a first evaluation value calculator configured to increase a count of a first evaluation value indicating a probability that the object image is a real image when all patterns of the confidence degree regarding the object image are determined to be high and a specific confidence degree that is determined in advance among the one or more patterns of the confidence degree is determined to continue to be high for a set number of frames or more; and a real image determiner configured to determine that the object image is a real image when a cumulative count of the first evaluation value exceeds a comparative value.

An aspect of the disclosure provides an object recognition device comprising: a confidence calculator configured to calculate one or more patterns of a confidence degree of an object image according to one or more preset calculation methods, the object image being to be detected in each frame on a basis of a reflected signal of a transmission signal; a first evaluation value calculator configured to increase a count of a first evaluation value indicating a probability that the object image is a real image when all patterns of the confidence degree regarding the object image are determined to be high and a specific confidence degree that is determined in advance among the one or more patterns of the confidence degree is determined to continue to be high for a set number of frames or more; and a real image determiner configured to determine that the object image is a real image when a cumulative count of the first evaluation value exceeds a comparative value.

An aspect of the disclosure provides an object recognition device configured to perform object recognition based on information from a unit including a sensor configured to detect an object image in each frame based on a reflected signal of a transmission signal and configured to calculate one or more patterns of a confidence degree regarding the object image detected according to one or more preset calculation methods, the object recognition device comprising: circuitry configured to increase a count of a first evaluation value indicating a probability that the object image is a real image when all patterns of the confidence degree regarding the object image are high and a specific confidence degree that is determined in advance among the one or more patterns of the confidence degree continues to be high for a set number of frames or more, and determine that the object image is a real image when a cumulative count of the first evaluation value exceeds a comparative value.

An aspect of the disclosure provides an object recognition device comprising: circuitry configured to calculate one or more patterns of a confidence degree of an object image according to one or more preset calculation methods, the object image being to be detected in each frame on a basis of a reflected signal of a transmission signal; increase a count of a first evaluation value indicating a probability that the object image is a real image when all patterns of the confidence degree regarding the object image are determined to be high and a specific confidence degree that is determined in advance among the one or more patterns of the confidence degree is determined to continue to be high for a set number of frames or more; and determine that the object image is a real image in a case where a cumulative count of the first evaluation value exceeds a comparative value.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to describe the principles of the disclosure.

FIG. 7 is a table illustrating variations in an evaluation value obtained by accumulating counts based on each confidence in FIG. 6;

FIG. 12 is a table illustrating variations in an evaluation value obtained by accumulating counts based on each confidence in FIG. 6 according to a first comparative example;

FIG. 13 is a table illustrating variations in an evaluation value obtained by accumulating counts based on each confidence in FIG. 6 according to a second comparative example;

DETAILED DESCRIPTION

For example, in the case where an object image is already detected by a sensor or the like used in a vehicle, the object image being a virtual image located close to an undetected real object, an object image of the undetected object may be detected in confusion with the already detected virtual image. In such a case, the object image detected in confusion (confused object image) will inherit the behavior (vector) of the virtual image so far. Additionally, if the confused object image is recognized as being a real image at a timing before the influence of behavior of the virtual image on the confused object image is resolved, a behavior (vector) that is different from the actual behavior may be recognized as the behavior (vector) of the real object, and emergency collision avoidance control incorporating such a behavior (vector) may be executed.

It is desirable to provide an object recognition device that can suppress the recognition of a behavior (vector) of an object image of a real object combined with a behavior (vector) of a virtual image, even in the case where the behavior of the object image is detected and recognized in confusion with the virtual image.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, quantities of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
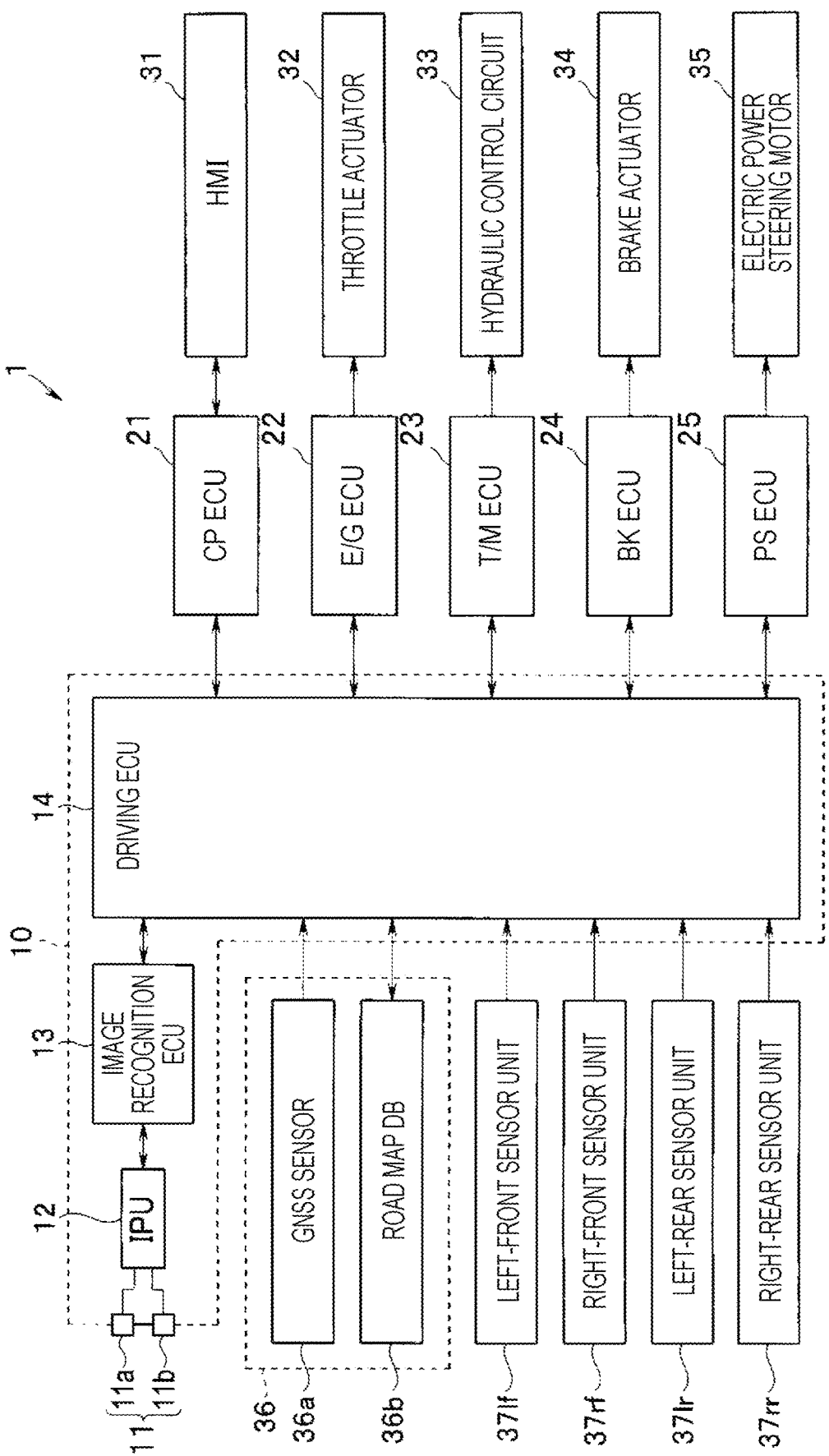
FIG. 1 is a schematic configuration diagram of a driver assistance device.
Figure 2:
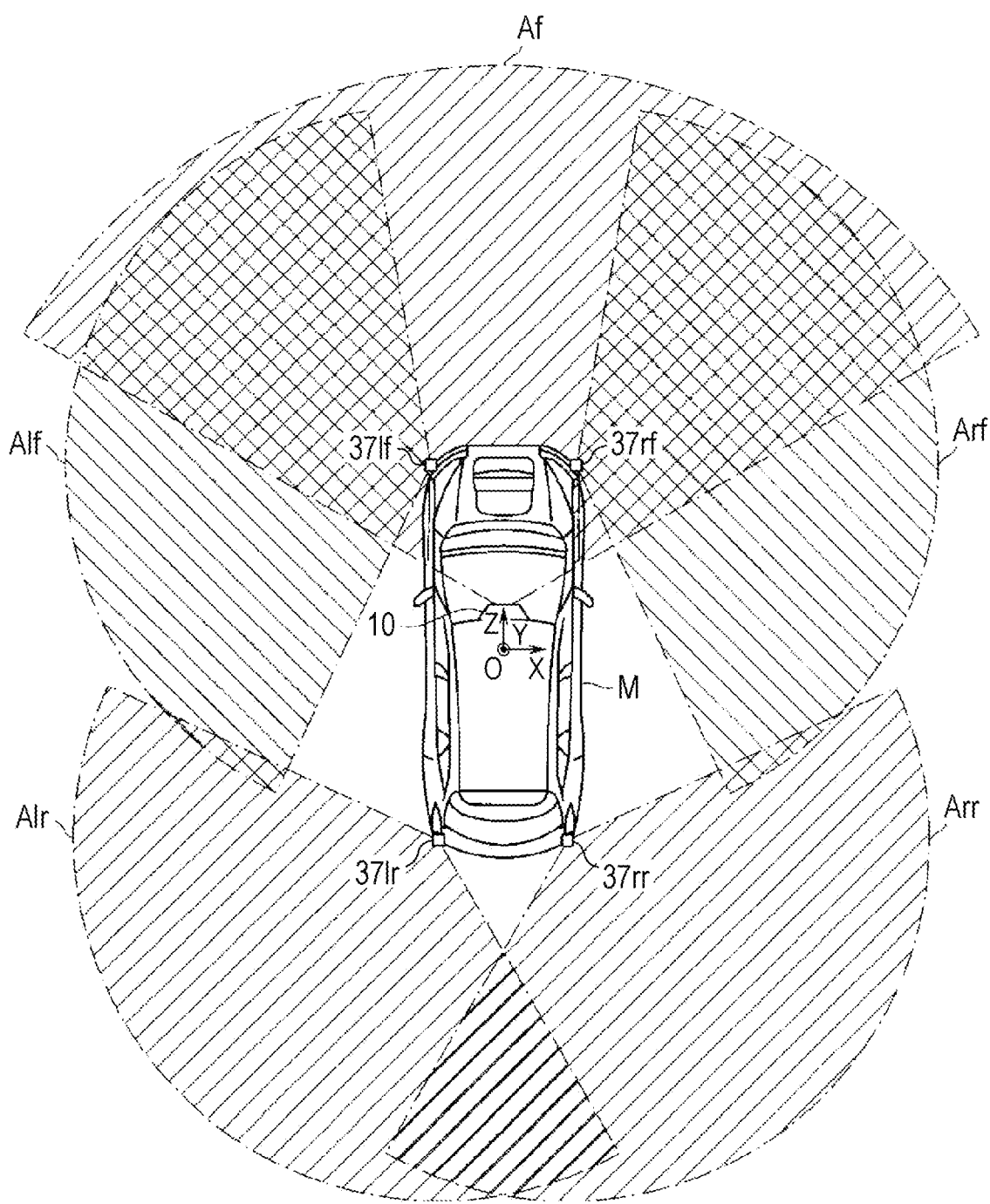
FIG. 2 is an explanatory diagram illustrating areas monitored by a stereo camera and a radar.

As illustrated in FIGS. 1 and 2, a driver assistance device 1 includes a camera unit 10 secured centrally in a frontal and upper area inside the cabin of a vehicle M, for example.

The camera unit 10 includes a stereo camera 11, an image processing unit (IPU) 12, an image recognition unit (image recognition ECU) 13, and a driving control unit (driving ECU) 14.

The stereo camera 11 includes a main camera 11a and a sub camera 11b. The main camera 11a and the sub camera 11b are formed from CMOS sensors, for example. The main camera 11a and the sub camera 11b are arranged with left-right symmetry relative to the center of the vehicle in the lateral direction.

The main camera 11a and the sub camera 11b perform stereo imaging, from different viewpoints, of the driving environment in a forward area Af outside the vehicle (see FIG. 2). The imaging cycles of the main camera 11a and the sub camera 11b are synchronized with one another.

The IPU 12 applies prescribed image processing to a driving environment image captured by the stereo camera 11. With this configuration, the IPU 12 detects the edges of various objects appearing in the image, such as three-dimensional objects and lane lines on the road surface. The IPU 12 also calculates range information from the amount of displacement between corresponding edges in the left and right images. With this configuration, the IPU 12 generates image information (range image information) containing range information.

The image recognition ECU 13 calculates, on the basis of the range image information received from the IPU 12 and the like, the road curvature (1/m) and the width (lane width) between the lane lines demarcating the left and right boundaries of the lane (vehicle path of travel) in which the vehicle M travels. The image recognition ECU 13 also calculates the road curvature and the width between the lane lines demarcating the left and right boundaries of a lane or the like adjacent to the lane in which the vehicle M travels. Various methods of calculating the road curvature and lane width are known. For example, the image recognition ECU 13 applies luminance-based binarization processing to each pixel in the range image. With this configuration, the image recognition ECU 13 extracts lane line candidate points on the road. The image recognition ECU 13 also performs a curve approximation using, for example, the method of least squares to the point sequences of the extracted lane line candidate points. With this configuration, the image recognition ECU 13 calculates the curvature of the left and right lane lines for each prescribed section. Additionally, the image recognition ECU 13 calculates the lane width from the curvature difference of the left and right lane lines.

The image recognition ECU 13 also calculates the lane center, the lateral deviation of the vehicle, and the like on the basis of the curvature of the left and right lane lines and the lane width. Here, the lateral deviation of the vehicle refers to the distance from the lane center to the center of the vehicle M in the lateral direction.

The image recognition ECU 13 also applies prescribed pattern matching or the like to the range image information. With this configuration, the image recognition ECU 13 recognizes three-dimensional objects such as guard rails, curbs, median strips, and nearby vehicles existing along the road. Here, in the recognition of a three-dimensional object in the image recognition ECU 13, properties such as the class of three-dimensional object, the distance to the three-dimensional object, the speed of the three-dimensional object, and the relative speed between the three-dimensional object and the vehicle M are recognized, for example.

Various information recognized in the image recognition ECU 13 is outputted to the driving ECU 14 as driving environment information.

In this way, in the present embodiment, the image recognition ECU 13, together with the stereo camera 11 and the IPU 12, recognizes information about the driving environment outside the vehicle. In one embodiment, the image recognition ECU 13, the stereo camera 11, and the IPU 12 may serve as a "driving environment recognizer".

The driving ECU 14 is a control unit for centrally controlling the driver assistance device 1.

Various control units, including a cockpit control unit (CP ECU) 21, an engine control unit (E/G ECU) 22, a transmission control unit (T/M ECU) 23, a brake control unit (BK ECU) 24, and a power steering control unit (PS ECU) 25, are coupled to the driving ECU 14 via an in-vehicle communication channel such as a controller area network (CAN).

Furthermore, various sensors, including a locator unit 36, a left-front sensor unit 37*lf*, a right-front sensor unit 37*rf*, a left-rear sensor unit 37*lr*, and a right-rear sensor unit 37*rr*, are coupled to the driving ECU 14.

A human-machine interface (HMI) 31 laid out around the driver's seat is coupled to the CP ECU 21. The HMI 31 includes, for example, operating switches for setting and executing various types of driver assistance control or the like, a mode-changing switch for changing the driver assistance mode, a steering touch sensor that detects whether the driver is gripping the steering wheel, a turn signal switch, a driver monitoring system (DMS) that performs face recognition, gaze detection, and the like with respect to the driver, a touch panel display, a combination meter, and a speaker.

The CP ECU 21 receives a control signal from the driving ECU 14. The CP ECU 21 appropriately informs the driver about various warnings regarding a vehicle ahead or the like, the implementation status of the driver assistance control, and various information pertaining to the driving environment and the like of the vehicle M, the above being conveyed by a visual display, sound or speech, or the like via the HMI 31.

The CP ECU 21 also outputs various input information to the driving ECU 14. The input information may include the on or off operating state of various types of driver assistance control, a designated speed (set speed) Vs for the vehicle M, and the operating state of the turn signal switch inputted by the driver through the HMI 31, and the ID of the driver whose face has been recognized by the DMS.

A throttle actuator 32 of an electronically controlled throttle or the like is coupled to the output side of the E/G ECU 22. Also, various sensors such as an acceleration sensor not illustrated are coupled to the input side of the E/G ECU 22.

The E/G ECU 22 controls the driving of the throttle actuator 32 on the basis of a control signal from the driving ECU 14, detection signals from the various sensors, or the like. With this configuration, the E/G ECU 22 regulates the engine intake air volume and causes a desired engine output to be produced. The E/G ECU 22 also outputs, to the driving ECU 14, signals indicating the accelerator pedal position and the like detected by the various sensors.

A hydraulic control circuit 33 is coupled to the output side of the T/M ECU 23. Also, various sensors such as a shift position sensor not illustrated are coupled to the input side of the T/M ECU 23. The T/M ECU 23 performs hydraulic control of the hydraulic control circuit 33 on the basis of an engine torque signal estimated in the E/G ECU 22, detection signals from the various sensors, and the like. With this configuration, the T/M ECU 23 activates a friction engagement element, a pulley, and the like provided in an automatic transmission to shift the engine output at a desired gear ratio. The T/M ECU 23 also outputs, to the driving ECU 14, signals indicating the shift position and the like detected by the various sensors.

A brake actuator 34 is coupled to the output side of the BK ECU 24. The brake actuator 34 regulates the brake fluid pressure to be outputted to a brake wheel cylinder provided on each wheel. Also, various sensors such as a brake pedal sensor, a yaw rate sensor, a longitudinal acceleration sensor, and a vehicle speed sensor not illustrated are coupled to the input side of the BK ECU 24.

The BK ECU 24 controls the driving of the brake actuator 34 on the basis of a control signal from the driving ECU 14 or detection signals from the various sensors. With this configuration, the BK ECU 24 causes a braking force to be produced in each wheel, the braking force being appropriate for performing forced braking control, yaw rate control, and the like with respect to the vehicle M. The BK ECU 24 also outputs, to the driving ECU 14, signals indicating the brake operating state, the yaw rate, the longitudinal acceleration, the vehicle speed (of the vehicle M itself), and the like detected by the various sensors.

An electric power steering motor 35 is coupled to the output side of the PS ECU 25. The electric power steering motor 35 applies a steering torque generated by the rotational force of the motor to the steering mechanism. Also, various sensors such as a steering torque sensor and a steering angle sensor are coupled to the input side of the PS ECU 25.

The PS ECU 25 controls the driving of the electric power steering motor 35 on the basis of a control signal from the driving ECU 14 or detection signals from the various sensors. With this configuration, the PS ECU 25 causes a steering torque to be produced in the steering mechanism. The PS ECU 25 also outputs, to the driving ECU 14, signals indicating the steering torque, steering angle, and the like detected by the various sensors.

The locator unit 36 includes a GNSS sensor 36*a* and a road map database (road map DB) 36*b*. Note that the higher the precision, the better, and if a high-precision road map database is available, the precision can be improved further by using the high-precision road map database.

The GNSS sensor 36a ascertains the location (such as the latitude, longitude, and altitude) of the vehicle M by receiving positioning signals transmitted from positioning satellites.

The road map DB 36b installed in the vehicle M may be a mass storage medium such as a hard disk drive (HDD). High-precision road map information (a dynamic map) may also be stored in the road map DB 36b. The road map information includes, for example, lane width data, lane center position coordinate data, lane heading azimuth data, speed limit data, and the like as lane data relevant to performing automated driving. The lane data is stored at intervals of several meters for each lane on the road map. On the basis of a request signal from the driving ECU 14, for example, the road map DB 36b outputs road map information in a set range based on the vehicle location ascertained by the GNSS sensor 36a to the driving ECU 14 as driving environment information. Note that if the road map DB 36b has favorable communication conditions, high-precision road map information (a dynamic map) that is particularly information-rich may be received from a source external to the vehicle M in association with the driving status of the vehicle M.

In this way, in the present embodiment, the road map DB 36b, together with the GNSS sensor 36a, recognizes information about the driving environment outside the vehicle. In one embodiment, the road map DB 36b and the GNSS sensor 36a may serve as a "driving environment recognizer".

The left-front sensor unit 37lf and the right-front sensor unit 37rf are provided with a millimeter-wave radar, for example. The left-front sensor unit 37lf and the right-front sensor unit 37rf are installed on the left and right ends, respectively, of the front bumper of the vehicle M, for example. The left-front sensor unit 37lf and the right-front sensor unit 37rf detect, as driving environment information, three-dimensional objects existing in areas Alf and Arf on the sides and diagonally ahead to the left and right of the vehicle M (see FIG. 2) that would be difficult to recognize from an image captured by the stereo camera 11.

The left-rear sensor unit 37lr and the right-rear sensor unit 37rr are provided with a millimeter-wave radar, for example. The left-rear sensor unit 37lr and the right-rear sensor unit 37rr are installed on the left and right ends, respectively, of the rear bumper, for example. The left-rear sensor unit 37lr and the right-rear sensor unit 37rr detect, as driving environment information, three-dimensional objects existing in areas Alr and Arr on the sides and diagonally behind to the left and right of the vehicle M (see FIG. 2) that would be difficult to recognize with the left-front sensor unit 37lf and the right-front sensor unit 37rf.

Since the left-front sensor unit 37lf, the right-front sensor unit 37rf, the left-rear sensor unit 37lr, and the right-rear sensor unit 37rr basically have the same configuration, in the following description, these units will be collectively referred to as the radar unit 37, as appropriate.

Figure 3:
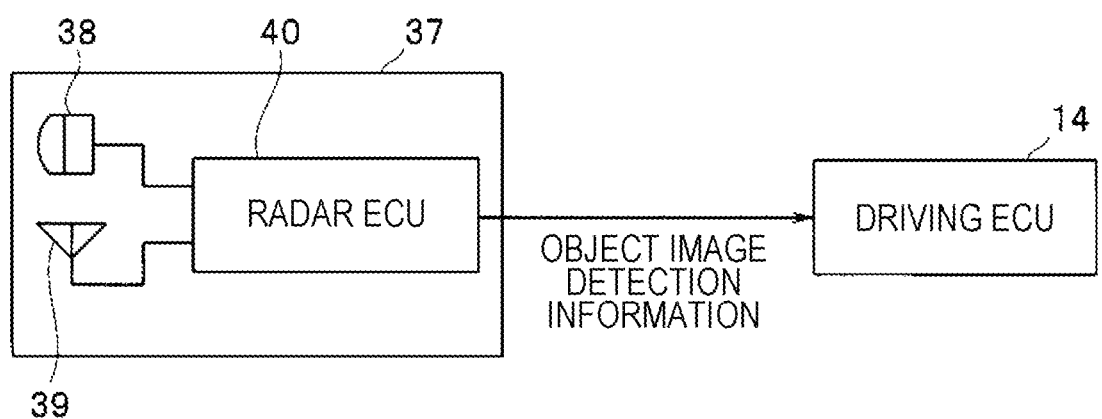
FIG. 3 is a schematic configuration diagram of a radar unit and an object recognition device.

As illustrated in FIG. 3, the radar unit 37 includes a transmitter 38, a receiver 39 (receiving antenna) 39, and a radar control unit (radar ECU) 40, for example.

The transmitter 38 irradiates a space with, for example, a millimeter-wave signal on a predetermined wavelength as a transmission signal.

The receiver 39 receives a reflected signal of the transmission signal that is reflected by various objects existing in a space A recognizable by the vehicle. That is, in the case where the radar unit 37 is the left-front sensor unit 37lf, for example, the receiver 39 receives a reflected signal of the transmission signal that is reflected by various objects existing inside the area Alf.

The radar ECU 40 causes the space to be irradiated with a transmission signal from the transmitter 38 at predetermined timings (frames). The radar ECU 40 also analyzes a reflected signal received by the receiver 39. With this configuration, the radar ECU 40 detects an object image existing inside the space A in each frame. The object image is an image existing near the vehicle and may include images of vehicles running parallel and following vehicles existing on the road in addition to images (real images) of pedestrians, side walls, and the like existing on the roadside.

The radar ECU 40 also calculates the width of the object image, the locations (relative to the vehicle M) of representative points of the object image, the behavior (a vector containing the movement speed and movement direction of the object image) of the object image, and the like as information supplementary to the object image.

Furthermore, the radar ECU 40 also calculates the confidence (in the disclosure(s), the confidence may indicate a confidence degree) regarding each detected object image in each frame. In the present embodiment, the radar ECU 40 calculates one or more patterns of the confidence D (in the present embodiment, for example, the three patterns of first to third confidences D1 to D3) of the object image on the basis of a preset calculation method. Note that the confidence may be calculated using a different ECU or may be calculated by a server or the like in cases where the communication conditions with equipment outside the vehicle M are favorable.

The first confidence D1 is calculated on the basis of the relative positional relationship between object images and the radar unit 37, for example. In the calculation of the first confidence D1, basically, the first confidence D1 is calculated as "high" with respect to an object image detected in a place where the object image would normally be detected. On the other hand, the first confidence D1 is calculated as "low" with respect to an object image detected in a place where the object image is not normally detected.

Figure 8:
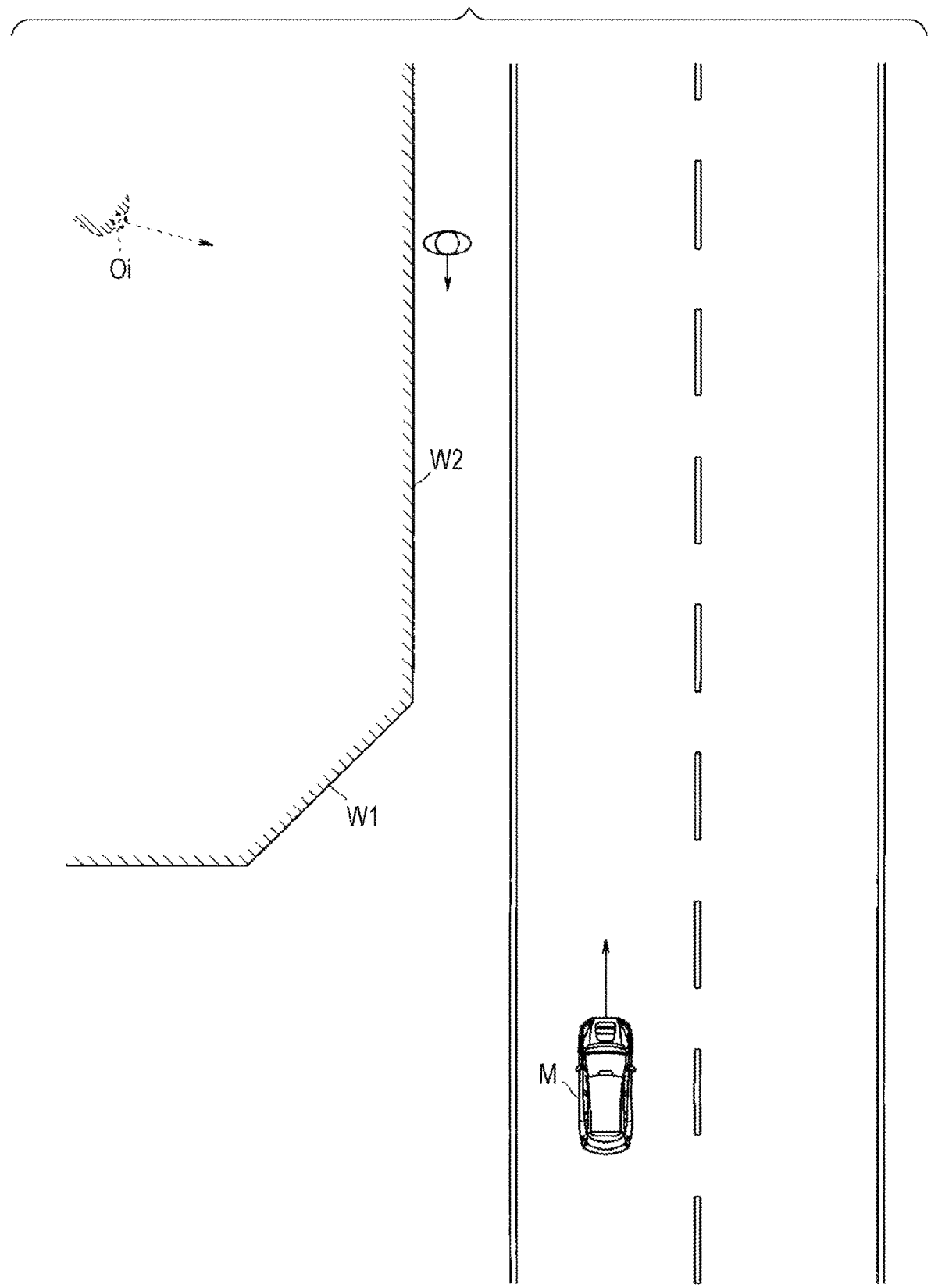
FIG. 8 is an explanatory diagram illustrating a virtual image of a vehicle.

For example, as illustrated in FIG. 8, in the case where an object image of a wall surface W1 inclined relative to the vehicle M is detected diagonally ahead of the vehicle M, basically, an object image Oi would not be detected farther away from the vehicle M than the wall surface W1. Consequently, the first confidence D1 for the object image Oi is calculated as "low". However, due to the characteristics of the radar unit 37, each reflection point of the transmission signal on the wall surface W1 is detected intermittently. Consequently, if it can be determined that the object Oi has been detected from a gap between the reflection points, the first confidence D1 for the object image Oi is calculated as "high".

The second confidence D2 is a confidence calculated with consideration for multipath characteristics, for example. That is, in the case where a static object that could be the cause of multipath propagation is detected, the predicted location of a moving object image Oi can be calculated from the distance from the radar unit 37 to the static object, the speed of the object image Oi, and the like. Accordingly, when the object image Oi exists inside a range of the predicted location, the second confidence D2 for the object image Oi is calculated as "low". Conversely, when the object image Oi exists outside a range of the predicted location, the second confidence D2 for the object image Oi is calculated as "high".

Note that the second confidence D2 is determined to be "low" at a lower frequency than the other confidences. Thus, in the case where the second confidence D2 is determined as "low" for an object image, there is a high probability that the object image is a virtual image.

The third confidence D3 is calculated on the basis of a time-series behavior of the object image, for example. The third confidence D3 that changes from "high" to "low" with highest responsiveness to changes in the detection status of the object image. In one embodiment, the third confidence D3 may serve as a "specific confidence".

The calculated first to third confidences D1 to D3 are outputted to the driving ECU 14 together with object image detection information.

In this way, in the present embodiment, the left-front sensor unit 37*lf*, the right-front sensor unit 37*rf*, the left-rear sensor unit 37*lr*, and the right-rear sensor unit 37*rr* recognize information about the driving environment outside the vehicle. In one embodiment, the left-front sensor unit 37*lf*, the right-front sensor unit 37*rf*, the left-rear sensor unit 37*lr*, and the right-rear sensor unit 37*rr* may serve as a "driving environment recognizer". In one embodiment, the radar ECU 40 may serve as a "confidence calculator".

Note that the coordinates of each object image detected respectively by the left-front sensor unit 37*lf*, the right-front sensor unit 37*rf*, the left-rear sensor unit 37*lr*, and the right-rear sensor unit 37*rr* are converted, together with coordinates of each object image outside the vehicle included in the driving environment information recognized by the image recognition ECU 13 and the locator unit 36, into coordinates in a three-dimensional coordinate system (see FIG. 2) taking the center of the vehicle M as the origin, for example.

If object image detection information and confidence information are inputted from the left-front sensor unit 37*lf*, the right-front sensor unit 37*rf*, the left-rear sensor unit 37*lr*, and the right-rear sensor unit 37*rr*, the driving ECU 14 determines whether each object image is a real image.

In the determination of whether an object image is a real image, the driving ECU 14 calculates an evaluation value Ve. A first evaluation value Ve1 is included in the evaluation value Ve. The first evaluation value Ve1 is obtained by accumulating a count of when the confidence for an object image is high to a prescribed level.

For example, the first evaluation value Ve1 is obtained by accumulating a count of when the first to third confidences D1 to D3 for the object image are all "high" and the third confidence D3 continues to be "high" for a set number of frames or more. For example, the driving ECU 14 calculates the first evaluation value Ve1 by adding a count of "1" to the first evaluation value Ve1 when the first to third confidences D1 to D3 for the object image are all "high" and the third confidence D3 continues to be "high" from the previous frame to the current frame.

In addition, a second evaluation value Ve2 is included in the evaluation value Ve. The second evaluation value Ve2 is obtained by accumulating a count of when the confidence for an object image is low to a prescribed level.

For example, the second evaluation value Ve2 is obtained by accumulating a count of when one or more of the first to third confidences D1 to D3 for the object image is "low". For example, the driving ECU 14 calculates the second evaluation value Ve2 by adding a count of "1" to the second evaluation value Ve2 when one or more of the first to third confidences D1 to D3 for the object image is "low". However, if the second confidence D2 is "low", there is a high probability that the object image is a virtual image, and therefore the driving ECU 14 adds a count of "2" to the second evaluation value Ve2 in this case.

Additionally, the driving ECU 14 determines that the object image is a real image when a set number of frames (for example, eight frames or more) have passed since the detection of the object image and the cumulative count of the first evaluation value Ve1 has exceeded the cumulative count of the second evaluation value Ve2. In other words, the driving ECU 14 recognizes that an object corresponding to the object image determined to be real image exists in a real space.

Thereafter, for each object image detected by the radar unit 37, the driving ECU 14 uses an object image determined to be a real image as an object of control by the various types of driver assistance control.

In one embodiment, the driving ECU 14 may serve as a "first evaluation value calculator", a "second evaluation value calculator", and a "real image determiner", and furthermore may serve as an "object recognition device".

In the driving ECU 14, a manual driving mode and first and second driving control modes for driving control are set up as driving modes. The driving ECU 14 can selectively switch among the driving modes on the basis of the operating status of a mode-changing switch provided in the HMI 31, for example.

The manual driving mode refers to a driving mode in which the driver grips the steering wheel. That is, in the manual driving mode, the vehicle M is driven in accordance with driving operations such as steering operations, accelerator operations, and brake operations performed by the driver, for example.

The first driving control mode is a driving mode in which the driver similarly grips the steering wheel. That is, the first driving control mode is what is referred to as a partially automated driving mode in which the vehicle M is driven to reflect driving operations performed by the driver, while also assisting the driver. The first driving control mode is achieved by having the driving ECU 14 output various control signals to the E/G ECU 22, the BK ECU 24, and the PS ECU 25, for example. The first driving control mode is mainly achieved by an appropriate combination of adaptive cruise control (ACC), active lane keep centering (ALKC) control, active lane keep bouncing (ALKB) control, lane changing control, and the like. With this configuration, the vehicle M can be driven along a target travel route. Furthermore, in the first driving control mode, a lane changing control may also be performed when a turn signal switch is operated by the driver.

The ACC control is basically performed on the basis of driving environment information inputted from the image recognition ECU 13 and the like.

That is, if a vehicle ahead of the vehicle M is recognized by the image recognition ECU 13 or the like, the driving ECU 14 performs a follow driving control as part of the ACC control, for example. In the follow driving control, the driving ECU 14 sets a target inter-vehicular distance Lt and a target speed Vt on the basis of, for example, the speed V1 of the vehicle ahead. Thereafter, the driving ECU 14 applies an acceleration-deceleration control to the vehicle M on the basis of the target inter-vehicular distance Lt and the target speed Vt. With this configuration, the driving ECU 14 basically causes the vehicle M to follow the vehicle ahead with the speed V maintained at the target speed Vt while also keeping the inter-vehicular distance L at the target inter-vehicular distance Lt.

On the other hand, if a vehicle ahead of the vehicle M is not recognized by the image recognition ECU 13 or the like, the driving ECU 14 performs a constant-speed driving control as part of the ACC control, for example. In the constant-speed driving control, the driving ECU 14 sets the designated speed Vs inputted by the driver as the target speed Vt. Thereafter, the driving ECU 14 applies an acceleration-deceleration control to the vehicle M on the basis of the target speed Vt. With this configuration, the driving ECU 14 keeps the speed V of the vehicle M at the designated speed Vs.

Also, the ALKC control and the ALKB control are basically performed on the basis of driving environment information inputted from one or more of the image recognition ECU 13 and the locator unit 36. That is, the driving ECU 14 sets a target path of travel Rm in the center of the vehicle driving lane and following the left and right lane markings on the basis of lane marking information and the like included in the driving environment information, for example. Thereafter, the driving ECU 14 keeps the vehicle M in the lane center by applying feed-forward control, feedback control, and the like to the steering on the basis of the target path of travel Rm. The driving ECU 14 also suppresses lane departure through a forced steering control when the vehicle M is determined to have a high likelihood of departing the vehicle driving lane due to the influence of crosswind, the cant of the road, or the like.

The second driving control mode is a driving mode that drives the vehicle M without the driver gripping the steering wheel or performing accelerator operations and brake operations. That is, the second driving control mode is what is referred to as an automated driving mode in which the vehicle M is driven autonomously without driving operations performed by the driver. The second driving control mode is achieved by having the driving ECU 14 output various control signals to the E/G ECU 22, the BK ECU 24, and the PS ECU 25, for example. The second driving control mode is mainly achieved by an appropriate combination of cruise control for following a vehicle ahead, ALKC control, ALKB control, and the like. With this configuration, the vehicle M can be driven in accordance with a target route (route map information).

The driving ECU 14 also performs, as appropriate, emergency collision avoidance control with respect to an obstacle such as a vehicle that is highly likely to collide with the vehicle M. The emergency collision avoidance control includes autonomous emergency braking (AEB) control, for example.

Emergency braking control is basically for applying braking to avoid a collision with an obstacle existing ahead of the vehicle M on the target path of travel Rm. When emergency braking control is active, the driving ECU 14 sets a target area of travel Am ahead of the vehicle M, for example. The target area of travel Am has a prescribed width (equal to or greater than the width of the vehicle M, for example) centered on the target path of travel Rm. On the basis of the driving environment information, the driving ECU 14 detects an obstacle such as a vehicle ahead or a stopped vehicle existing in the target area of travel Am. Furthermore, the driving ECU 14 calculates a time-to-collision (longitudinal time-to-collision) TTCz in the longitudinal direction of the vehicle M as the time-to-collision with respect to the obstacle. The longitudinal time-to-collision TTCz is calculated on the basis of the relative speed and relative distance between the vehicle M and the obstacle.

Thereafter, the driving ECU 14 executes a primary braking control when the longitudinal time-to-collision TTCz goes below a preset first threshold value Tth1. The primary braking control is what is referred to as warning braking for alerting the driver through deceleration, for example. If the primary braking control is initiated, the driving ECU 14 decelerates the vehicle M using a preset first target deceleration a1 (for example, 0.4 G). Note that when the primary braking control is executed, a visual or auditory warning may also be issued through the HMI 31, for example.

Additionally, the driving ECU 14 executes a secondary braking control when the longitudinal time-to-collision TTCz goes below a preset second threshold value Tth2 (where Tth2<Tth1). If the secondary braking control is initiated, the driving ECU 14 decelerates the vehicle M using a preset second target deceleration a2 (for example, 1 G) until the relative speed with respect to the obstacle reaches "0".

Such an emergency braking control is also extended to pedestrians and the like having a vector that intrudes into the target area of travel Am of the vehicle M from a sidewalk or the like on the roadside, for example. Information about pedestrians and the like in this case is mainly obtained from object images detected by each radar unit 37. However, an object image detected by the radar unit 37 is not treated as an object of control by the emergency braking control and the like until the object image is recognized as a real image by the driving ECU 14. This is to prevent the emergency braking control and the like from being executed inappropriately with respect to a virtual image created by multipath propagation or the like.

Figure 4:
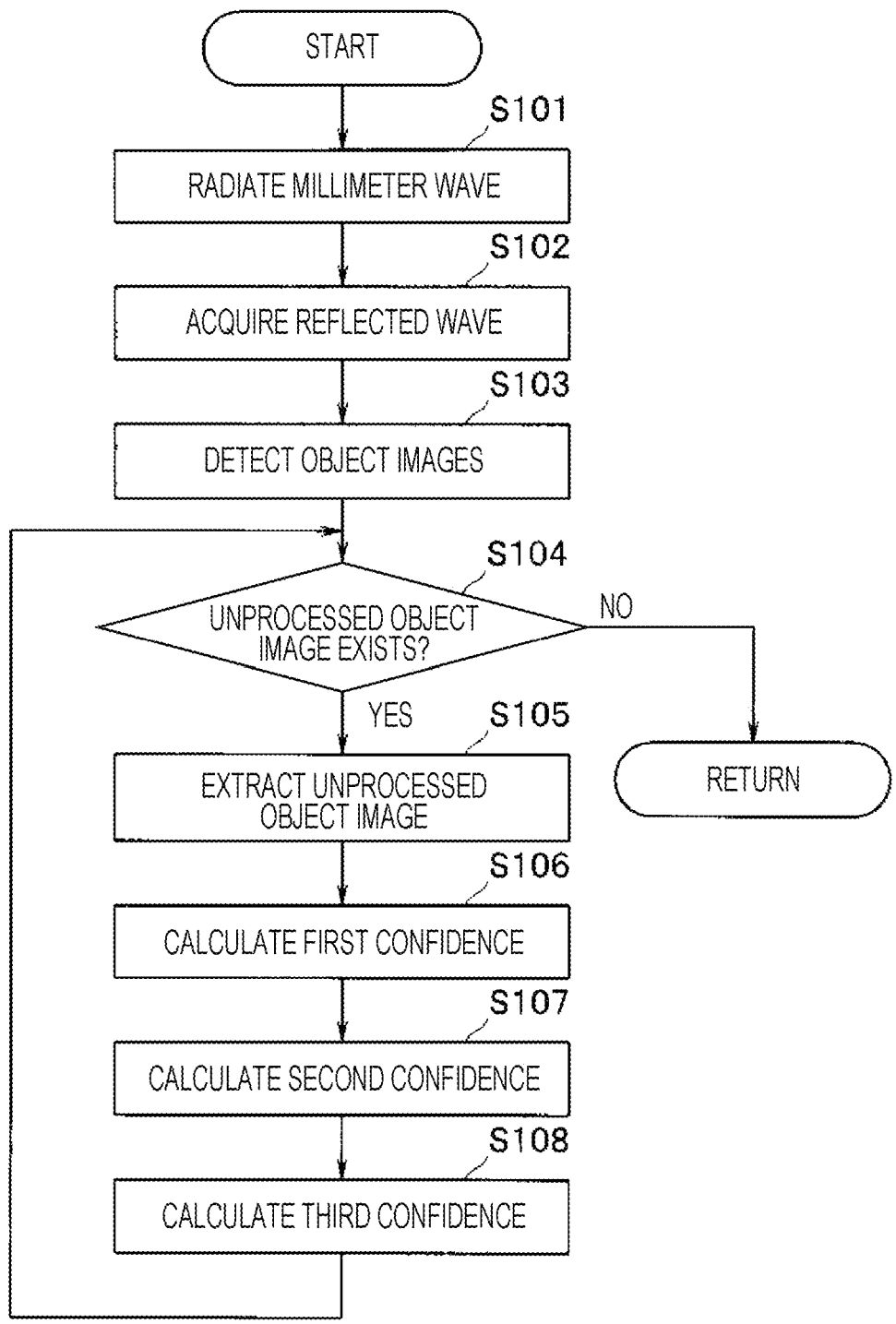
FIG. 4 is a flowchart illustrating an object image detection routine.

Next, the object image detection performed by the radar ECU 40 will be described by following a flowchart of an object image detection routine illustrated in FIG. 4. The routine is executed repeatedly on a set time interval.

When the routine is started, in step S101, the radar ECU 40 controls the driving of the transmitter 38 to irradiate a three-dimensional space around the vehicle M with the transmission signal, namely a millimeter wave.

In the following step S102, the radar ECU 40 acquires a reflected wave (reflected signal) of the millimeter wave received by the receiver 39.

In the following step S103, the radar ECU 40 detects object images on the basis of the acquired reflected wave and also calculates the widths of the object images, the locations of representative points of the object images, the movement and movement directions (vector) of the object images, and the like as information supplementary to the object images.

In the following step S104, the radar ECU 40 checks whether an object image that is unprocessed in relation to the first to third confidences D1 to D3 described later exists among the currently detected object images. That is, the radar ECU 40 checks whether an object image for which the first to third confidences D1 to D3 have not been calculated exists among the currently detected object images.

In step S104, if an unprocessed object image is determined to exist (step S104: YES), the radar ECU 40 proceeds to step S105.

In step S105, the radar ECU 40 extracts an unprocessed object image from the currently detected object images.

Thereafter, in steps S106 to S108, the radar ECU 40 successively calculates the first confidence D1, the second confidence D2, and the third confidence D3, and then returns to step S104.

Also, in step S104, if an unprocessed object image is determined not to exist among the detected object images (step S104: NO), the radar ECU 40 escapes the routine.

Figure 5:
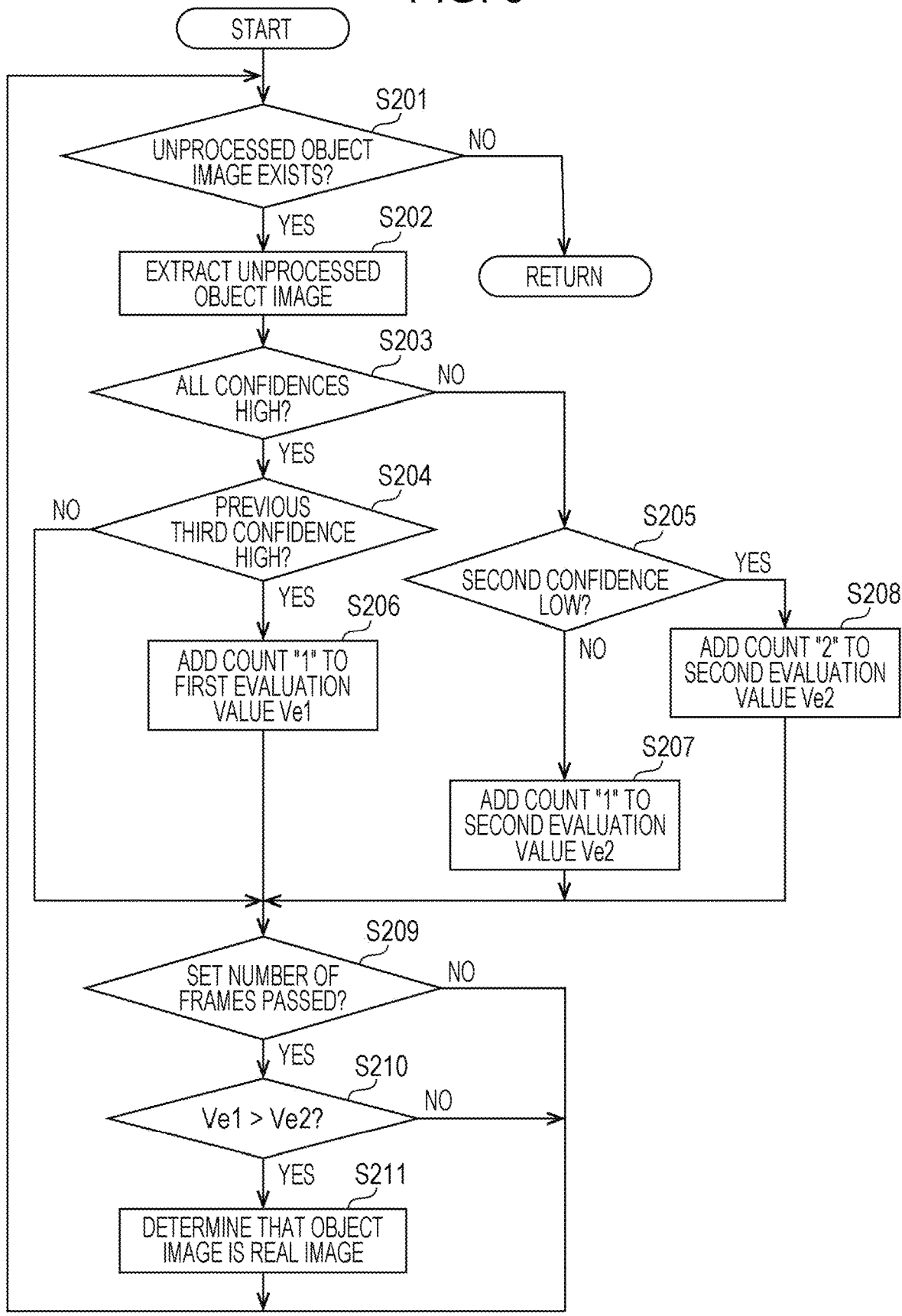
FIG. 5 is a flowchart illustrating a real image determination routine with respect to an object image.

Next, a real image determination process for an object image executed by the driving ECU 14 will be described by following a flowchart of a real image determination routine illustrated in FIG. 5. The routine is executed repeatedly on a set time interval.

If the real image determination routine is started, in step S201, the driving ECU 14 checks whether an object image that is unprocessed in relation to real image determination exists among the object images currently inputted from the radar unit 37.

In step S201, if an unprocessed object image is determined to exist (step S201: YES), the driving ECU 14 proceeds to step S202.

In step S202, the driving ECU 14 extracts an unprocessed object image from the currently inputted object images.

In the following step S203, the driving ECU 14 checks whether the first to third confidences D1 to D3 are all "high" for the extracted object image.

In step S203, if one or more of the first to third confidences D1 to D3 is determined to be "low" (step S203: NO), the driving ECU 14 proceeds to step S205.

On the other hand, in step S203, if the first to third confidences D1 to D3 are all determined to be "high" (step S203: YES), the driving ECU 14 proceeds to step S204.

In the case of proceeding from step S203 to step S204, the driving ECU 14 checks whether the previous third confidence D3 was "high" for the same object image as the currently extracted object image.

In step S204, if the previous third confidence D3 is determined to have been "low" (step S204: NO), the driving ECU 14 proceeds to step S209.

On the other hand, in step S204, if the previous third confidence D3 is determined to have been "high" (step S204: YES), the driving ECU 14 proceeds to step S206.

In step S206, the driving ECU 14 adds a count of "1" to the first evaluation value Ve1.

In the case of proceeding from step S203 to step S205, the driving ECU 14 checks whether the second confidence D2 for the object image is "low".

In step S205, if the second confidence D2 is determined to be "high" (step S205: NO), the driving ECU 14 proceeds to step S207.

In step S207, the driving ECU 14 adds a count of "1" to the second evaluation value Ve2.

On the other hand, in step S205, if the second confidence D2 is determined to be "low" (step S205: YES), the driving ECU 14 proceeds to step S208.

In step S208, the driving ECU 14 adds a count of "2" to the second evaluation value Ve2.

In the case of proceeding to step S209 from step S204, S206, S207, or S208, the driving ECU 14 checks whether, for example, a set number of millimeter-wave radar frames (for example, eight frames) have passed consecutively since the initial detection of the currently extracted object image.

In step S209, if the set number of frames (for example, eight frames) has not passed since the detection of the object image (step S209: NO), the driving ECU 14 returns to step S201.

On the other hand, in step S209, if the set number of frames (for example, eight frames) has passed since the detection of the object image (step S209: YES), the driving ECU 14 proceeds to step S210.

In step S210, the driving ECU 14 checks whether the first evaluation value Ve1 is greater than the second evaluation value Ve2.

In step S210, if the first evaluation value Ve1 is determined to be less than or equal to the second evaluation value Ve2 (step S210: NO), the driving ECU 14 returns to step S201.

On the other hand, in step S210, if the first evaluation value Ve1 is determined to be greater than the second evaluation value Ve2 (step S210: YES), the driving ECU 14 proceeds to step S211.

In step S211, the driving ECU 14 determines that the object image extracted at the current time point of the vehicle M being driven is a real image, and then returns to step S201.

In step S201, if an unprocessed object image is determined not to exist (step S201: NO), the driving ECU 14 escapes the routine.

Next, an example of the effect of such processing will be described with reference to FIGS. 8 to 11.

For example, FIG. 8 illustrates a state in which an object image (virtual image Oi) of the vehicle M is detected farther away than the wall surface W1 due to multipath propagation caused by the wall surface W1. The virtual image Oi is detected by, for example, the transmission signal radiated from the transmitter 38 of the left-front sensor unit 37lf being reflected by the wall surface W1, reflected by the vehicle M, and/or re-reflected by the wall surface W1, and then received by the receiver 39. Note that in FIG. 8, a pedestrian is moving along a wall surface W2 substantially parallel to the forward direction of the vehicle M, but the reflected intensity of the pedestrian to millimeter waves is weak compared to metal and the like. Consequently, at the stage illustrated in FIG. 8, it is assumed that the pedestrian has not been detected by the radar unit 37.

Figure 9:
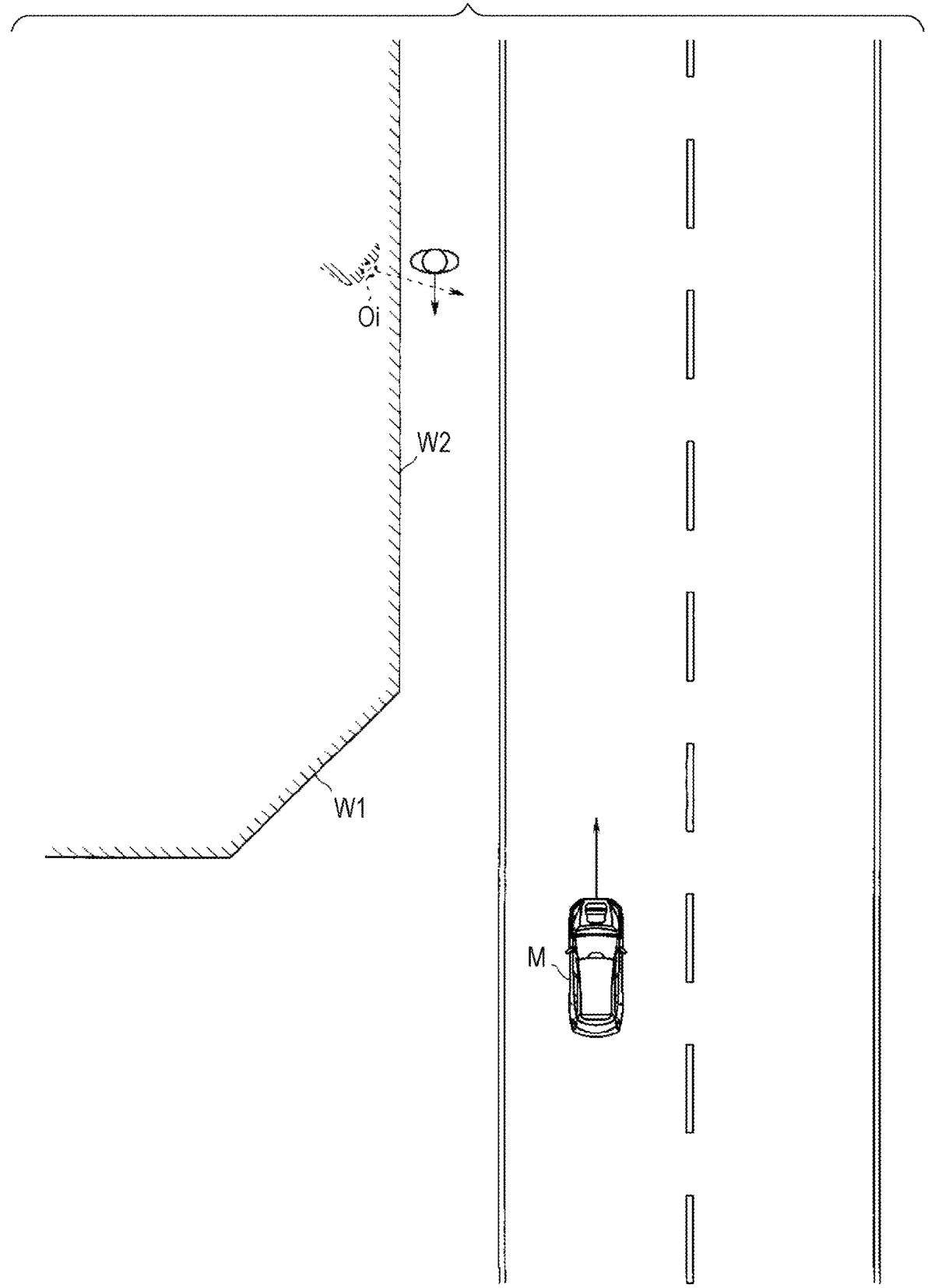
FIG. 9 is an explanatory diagram illustrating a virtual image of a vehicle and an image of a pedestrian.

As illustrated in FIG. 9, the virtual image Oi of the vehicle M detected in this way moves toward the wall surface W2 in association with the forward travel of the vehicle M.

Figure 6:
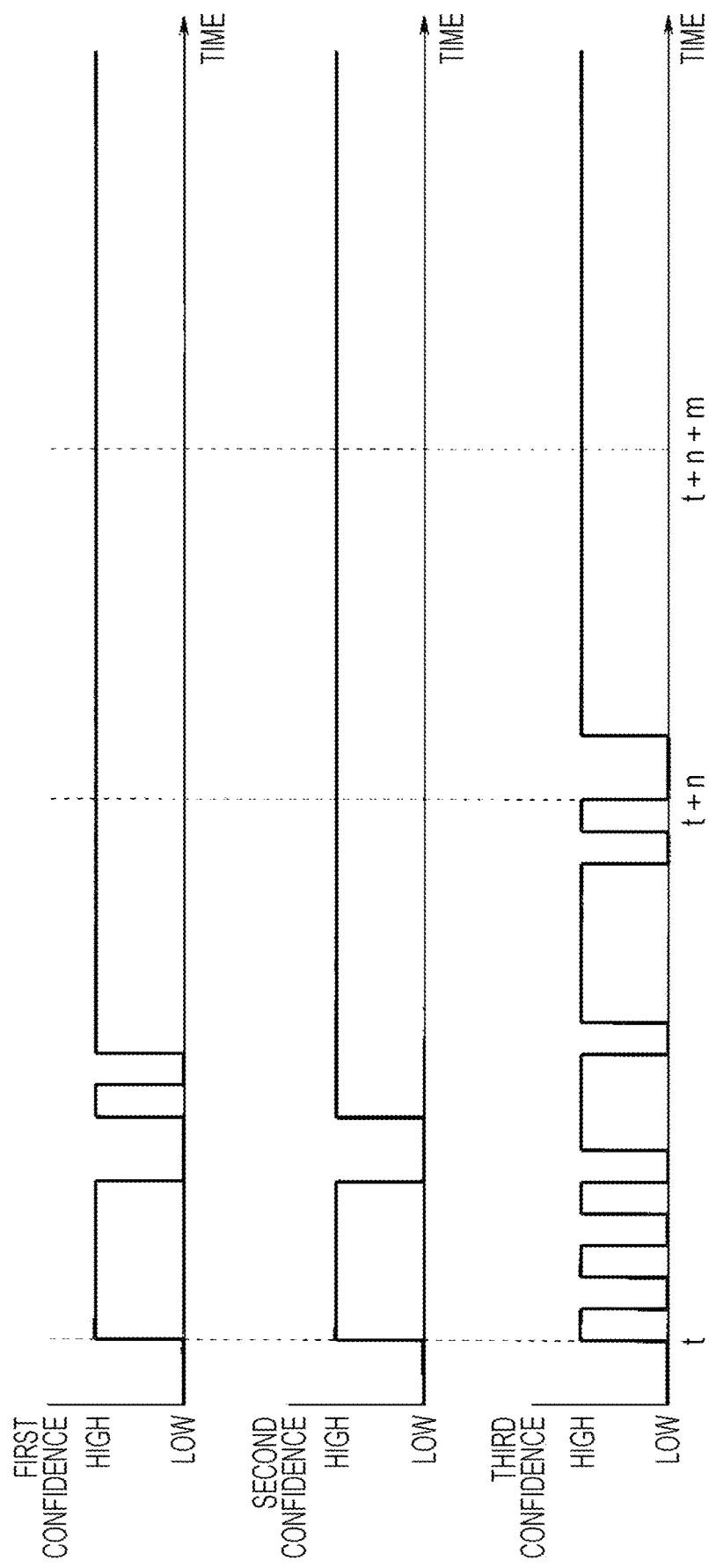
FIG. 6 is a time chart illustrating an example of variations in the confidence regarding an object image calculated according to multiple patterns of calculation methods.

During this time, as indicated up to t+n in FIG. 6, for example, the first to third confidences D1 to D3 fluctuate between "high" and "low". In particular, the third confidence D3 fluctuates frequently between "high" and "low" with high responsiveness. Consequently, as illustrated in FIG. 7, although the count of the second evaluation value Ve2 increases adequately, the count of the first evaluation value Ve1 does not increase as much as the count of the second evaluation value Ve2.

Figure 10:
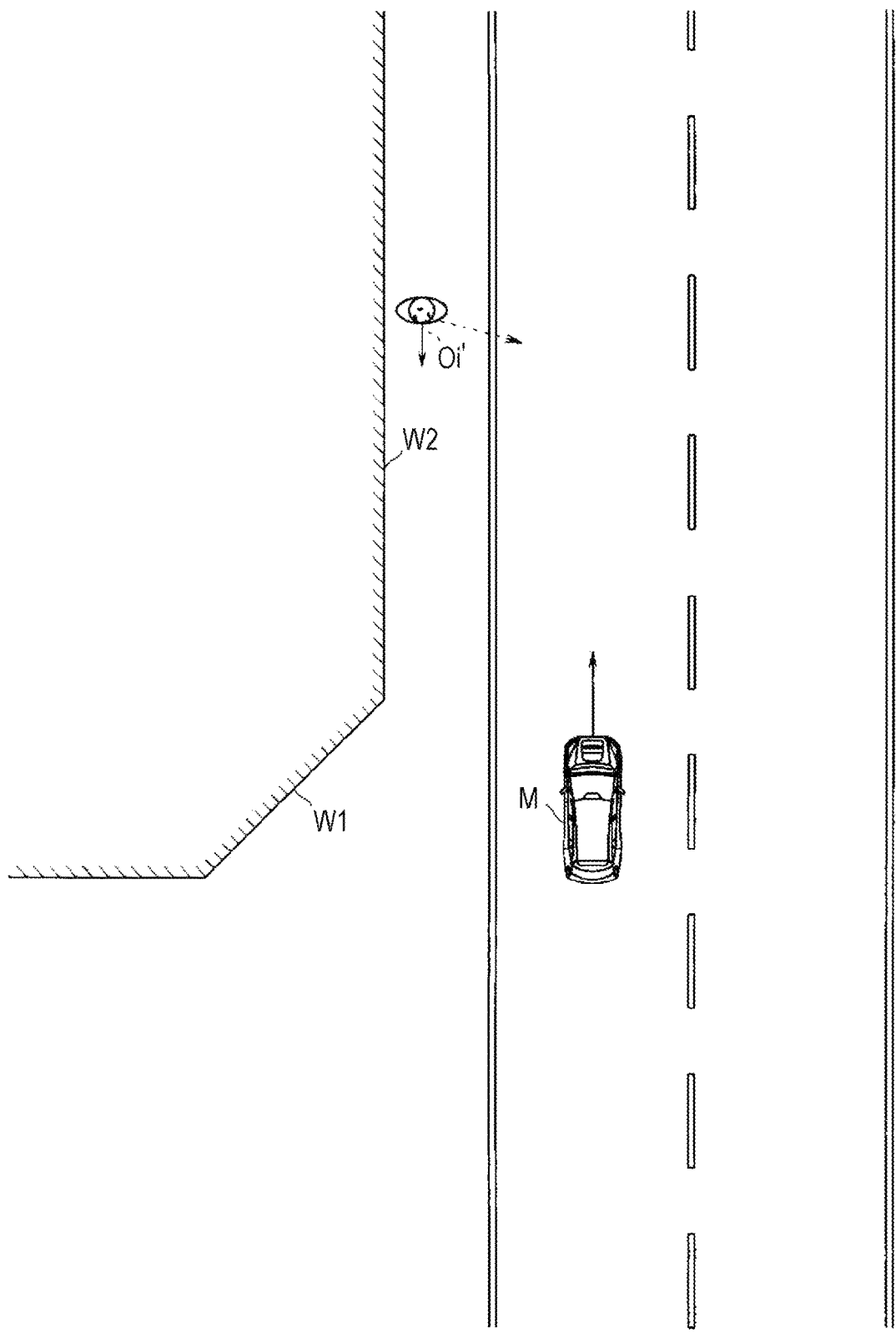
FIG. 10 is an explanatory diagram illustrating an image of a pedestrian confused with a virtual image of a vehicle.

FIG. 10 illustrates a case where the pedestrian exists near the virtual image Oi by coincidence at a timing when the virtual image Oi of the vehicle M is close to the wall surface W2, for example. In this case, if the radar unit 37 receives a reflected wave from the pedestrian existing beside the wall surface W2 substantially parallel to the forward direction of the vehicle M, an object image of the pedestrian may be detected in confusion because of the virtual image Oi in close proximity (see Oi' in FIG. 10).

The object image Oi' of the pedestrian detected in confusion with the virtual image Oi in this way inherits the behavior (such as the movement speed and direction) and the counts of the first and second evaluation values Ve1 and Ve2 of the virtual image Oi.

In the example illustrated in the drawing, since the pedestrian actually exists, the first to third confidences D1 to D3 for the object image Oi' are maintained in a relatively stable "high" state (see t+n and thereafter in FIG. 6).

However, the object image Oi' inherits the count of the first evaluation value Ve1, which is still much lower than the count of the second evaluation value Ve2. Consequently, recognition of the object image Oi' as a real image at a relatively early timing after detection is suppressed.

As the count of the first evaluation value Ve1 becomes equal to the count of the second evaluation value Ve2 (the period until t+n+m in FIG. 6), the behavioral influence inherited from the virtual image Oi gradually lessens, and the behavior of the object image Oi' approaches the behavior of the actual pedestrian.

Figure 11:
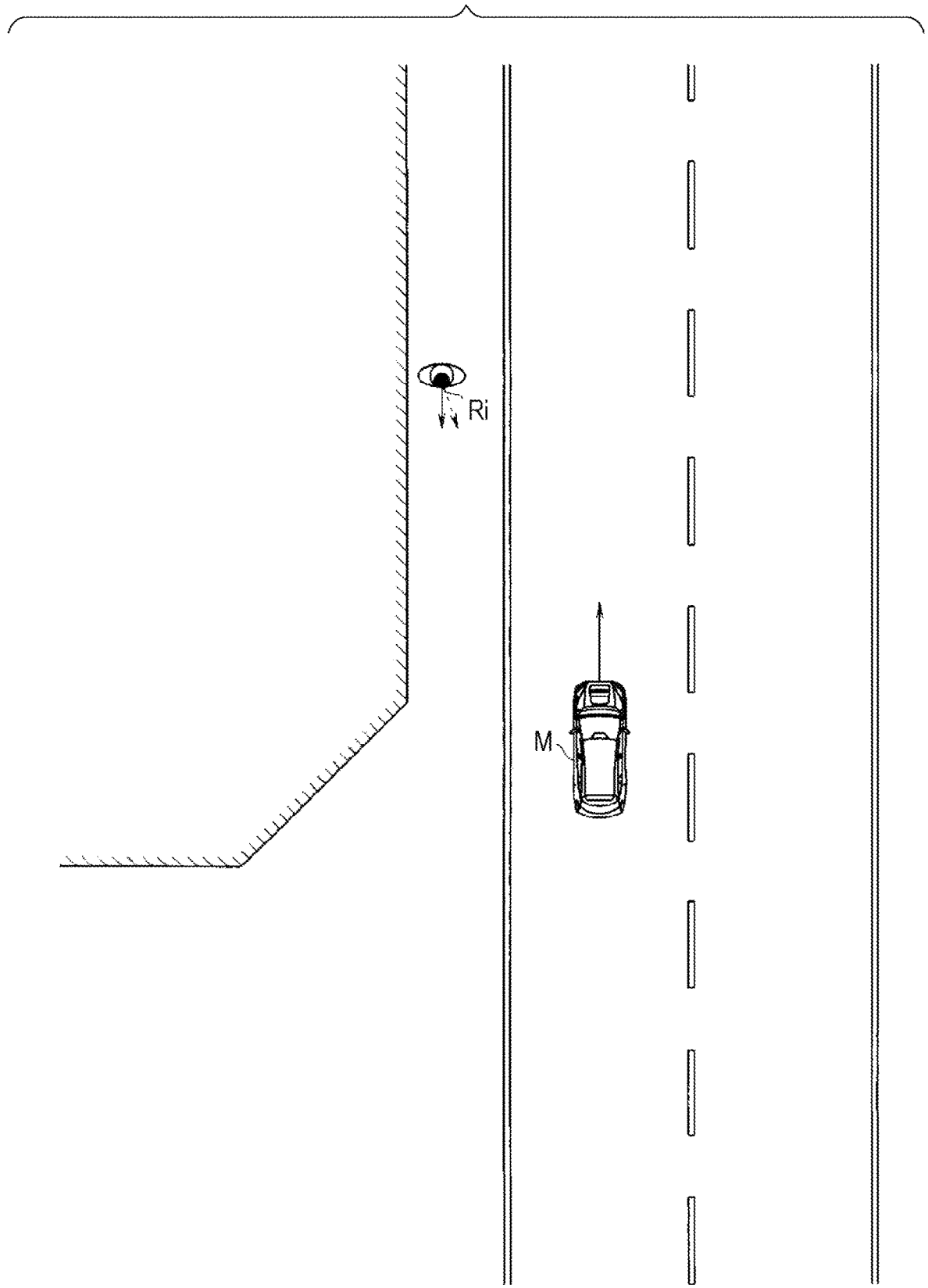
FIG. 11 is an explanatory diagram illustrating an image of a pedestrian recognized as a real image.

Thereafter, the count of the first evaluation value Ve1 exceeds the count of the second evaluation value Ve2, causing the object image Oi' to be recognized as a real image Ri (see FIG. 11).

Consequently, mistaken execution of the emergency braking control and the like in response to the object image (real image Ri) of the pedestrian detected by the radar unit 37 is prevented appropriately.

Note that FIGS. 12 and 13 are illustrations of variations in the first and second evaluation values Ve1 and Ve2 calculated according to another calculation method with respect to the first to third confidences D1 to D3 illustrated in FIG. 6.

The first evaluation value Ve1 illustrated in FIG. 12 is an evaluation value to which a count of "1" is added when the first to third confidences D1 to D3 are all "high", irrespectively of the state of confidence for the previous frame.

Also, the second evaluation value Ve2 illustrated in FIG. 12 is an evaluation value to which a count of "1" is added when one or more of the first to third confidences D1 to D3 is "low", irrespectively of the type of confidence.

The first evaluation value Ve1 illustrated in FIG. 13 is similar to the first evaluation value Ve1 illustrated in FIG. 12.

Also, the second evaluation value Ve2 illustrated in FIG. 13 is similar to the second evaluation value Ve2 illustrated in FIG. 7.

If the object image Oi' is determined to be the real image Ri from the above evaluation values, the object image Oi' is determined to be the real image Ri before the influence of the behavior (vector) of the virtual image Oi lessens, and consequently, unnecessary emergency braking control and the like may be performed. That is, it may be determined that the real image Ri will jump out into the forward direction of the vehicle M.

According to an embodiment like the above, the driving ECU 14 adds a count of "1" to the first evaluation value Ve1 indicating the probability that an object image is a real image when all patterns of confidence (the first to third confidences D1 to D3) for the object image are high and the third confidence D3 continues to be high for two frames or more. When the first evaluation value Ve1 exceeds a comparative value, the driving ECU 14 determines that the object image is a real image.

With this configuration, the mistaken recognition of the behavior of an object image of a real object can be suppressed, even in the case where the object image is detected in confusion with a virtual image.

That is, by calculating the first evaluation value Ve1 as described above, even if an object image of a real object is detected in confusion with a virtual image, and even if the behavior of the virtual image is inherited as the behavior of the object image, the determination of the object image as a real image can be prevented appropriately until the influence of the virtual image is sufficiently reduced.

In this case, the second evaluation value Ve2 is calculated by adding a count when one or more of the first to third confidences D1 to D3 for an object image is low. By calculating the second evaluation value Ve2 as a comparative value, an appropriate comparative value reflecting the variation in the first to third confidences D1 to D3 can be set.

Also, among the first to third confidences D1 to D3, the third confidence D3 changes with the highest responsiveness to changes in the detection status of an object image. By setting the third confidence D3 as a specific confidence, an unnecessarily fast rise in the count of the first evaluation value Ve1 can be prevented appropriately.

Figure 14:
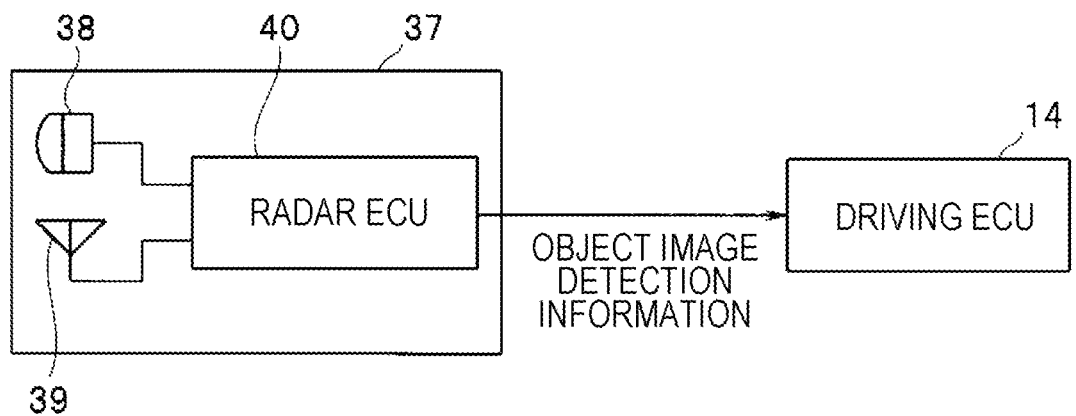
FIG. 14 is a schematic configuration diagram of a radar unit and an object recognition device according to a first modification.
Figure 15:
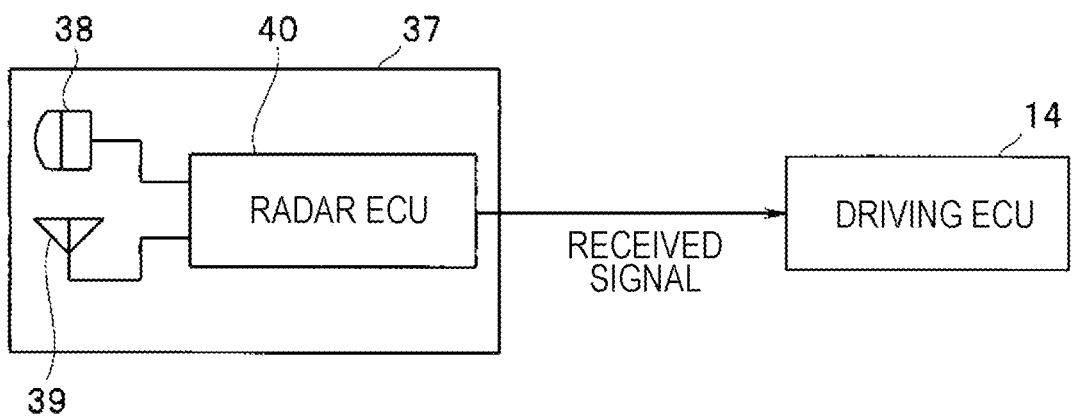
FIG. 15 is a schematic configuration diagram of a radar unit and an object recognition device according to a second modification.

The above embodiment describes an example of a configuration in which the radar unit 37 detects object images, calculates the first to third confidences D1 to D3, and outputs object image information to the driving ECU 14. However, the disclosure is not limited to such a configuration. For example, as illustrated in FIG. 14, the radar unit 37 may simply output object image detection information to the driving ECU 14, and the driving ECU 14 may calculate the first to third confidences D1 to D3. As another example, as illustrated in FIG. 15, the radar unit 37 may simply output a received signal to the driving ECU 14, and the driving ECU 14 may detect object images and calculate the first to third confidences D1 to D3. In one embodiment, the driving ECU 14 may serve as a "confidence calculator". Moreover, the above embodiment is not limited to radar and is applicable to any recognition device that could mistakenly recognize a virtual image.

In the above embodiment, the image recognition ECU 13, driving ECU 14, CP ECU 21, E/G ECU 22, T/M ECU 23, BK ECU 24, PS ECU 25, radar ECU 40, and the like are a known microcomputer and peripheral equipment. The microcomputer is provided with a CPU, RAM, ROM, non-volatile storage, and the like. Static data such as programs to be executed by the CPU and data tables are stored in advance in the ROM. Note that some or all of the functions of a processor may be configured as a logical circuit or an analog circuit. Processes by various programs may also be achieved by an electronic circuit such as an FPGA.

The disclosure described in the above embodiment is not limited to the above forms. In the implementation stage, various modifications can be carried out without departing from the gist of the disclosure. Furthermore, the above forms include various levels of disclosure, and various disclosure may be elicited through appropriate combination of the multiple structural elements disclosed herein.

For example, even if several structural elements are removed from among all of the structural elements illustrated in the forms, the configuration with structural elements removed therefrom may still be elicited as the disclosure insofar as the stated problem can be addressed and the stated effect is obtained.

For example, a threshold value with a preset count can be used as the comparative value in place of the second evaluation value Ve2.

The confidence may be one or more confidences including a confidence corresponding to the third confidence D3. Obviously, the other confidences are not limited to the first and second confidences D1 and D2 described above.

The driving ECU 14 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the driving ECU 14. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM.

The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. An object recognition device configured to perform object recognition based on information from at least one sensor unit configured to (1) detect an object image in each frame based on a reflected signal of a transmission signal, and (2) calculate a plurality of patterns of a confidence degree regarding the object image detected according to a plurality of preset calculation methods, the object recognition device comprising:
a first evaluation value calculator configured to increase a count of a first evaluation value indicating a probability that the object image is a real image, wherein the count is increased when:
all of the plurality of patterns of the confidence degree regarding the object image are determined to be high relative to respective thresholds, and
one of the plurality of patterns, which is predetermined as a specific confidence degree, is determined to continue to be high for a set number of frames or more, the specific confidence degree being a pattern that changes with a highest responsiveness to a change of a detection status of the object image among the plurality of patterns; and
a real image determiner configured to determine that the object image is a real image when a cumulative count of the first evaluation value exceeds a comparative value.

2. An object recognition device comprising:
a confidence calculator configured to calculate a plurality of patterns of a confidence degree of an object image according to a plurality of preset calculation methods, the object image being to be detected in each frame on a basis of a reflected signal of a transmission signal from at least one sensor unit;
a first evaluation value calculator configured to increase a count of a first evaluation value indicating a probability that the object image is a real image, wherein the count is increased when:
all of the plurality of patterns of the confidence degree regarding the object image are determined to be high relative to respective thresholds, and
one of the plurality of patterns, which is predetermined as a specific confidence degree, is determined to continue to be high for a set number of frames or more, the specific confidence degree being a pattern that changes with a highest responsiveness to a change of a detection status of the object image among the plurality of patterns; and
a real image determiner configured to determine that the object image is a real image when a cumulative count of the first evaluation value exceeds a comparative value.

3. The object recognition device according to claim 1, further comprising:
a second evaluation value calculator configured to increase a count of a second evaluation value indicating a probability that the object image is a virtual image when at least one pattern from among the plurality of patterns of the confidence degree regarding the object image is determined to be low, wherein
the real image determiner is configured to determine that the object image is a real image when a set number of frames have passed since the object image is detected and the count of the first evaluation value exceeds the count of the second evaluation value.

4. The object recognition device according to claim 2, further comprising:
a second evaluation value calculator configured to increase a count of a second evaluation value indicating a probability that the object image is a virtual image when at least one pattern from among the plurality of patterns of the confidence degree regarding the object image is low, wherein
the real image determiner is configured to determine that the object image is a real image when a set number of frames have passed since the object image is detected and the count of the first evaluation value exceeds the count of the second evaluation value.

5. An object recognition device configured to perform object recognition based on information from at least one sensor unit including a sensor configured to (1) detect an object image in each frame based on a reflected signal of a transmission signal, and (2) calculate a plurality of patterns of a confidence degree regarding the object image detected according to a plurality of preset calculation methods, the object recognition device comprising:
circuitry configured to
increase a count of a first evaluation value indicating a probability that the object image is a real image, wherein the count is increased when:
all of the plurality of patterns of the confidence degree regarding the object image are high relative to respective thresholds, and
one of the plurality of patterns, which is predetermined as a specific confidence degree, continues to be high for a set number of frames or more, the specific confidence degree being a pattern that changes with a highest responsiveness to a change of a detection status of the object image among the plurality of patterns; and
determine that the object image is a real image when a cumulative count of the first evaluation value exceeds a comparative value.

6. An object recognition device comprising:
circuitry configured to:
calculate a plurality of patterns of a confidence degree of an object image according to a plurality of preset calculation methods, the object image being to be detected in each frame on a basis of a reflected signal of a transmission signal from at least one sensor unit;
increase a count of a first evaluation value indicating a probability that the object image is a real image, wherein the count is increased when:
all of the plurality of patterns of the confidence degree regarding the object image are determined to be high relative to respective thresholds, and
one of the plurality of patterns, which is predetermined as a specific confidence degree is determined to continue to be high for a set number of frames or more, the specific confidence degree being a pattern that changes with a highest responsiveness to a change of a detection status of the object image among the plurality of patterns; and
determine that the object image is a real image in a case where a cumulative count of the first evaluation value exceeds a comparative value.

7. The object recognition device according to claim 1, wherein a first pattern of the confidence degree is calculated based on a positional relationship between a position of the object image and a detected stationary object, and the first pattern is determined to be high when the position of the object image is located in a region that is not visually obstructed by the stationary object, and is determined to be low when the position of the object image is located in a region that is visually obstructed by the stationary object.

8. The object recognition device according to claim 1, wherein
a second pattern of the confidence degree is calculated based on a predicted ghost location estimated using a position of a detected stationary object and a motion vector derived from changes in a position of the object image, and
the second pattern is determined to be high when the position of the object image does not correspond to the predicted ghost location, and is determined to be low when the position of the object image corresponds to the predicted ghost location.

9. The object recognition device according to claim 1, wherein
the specific confidence degree is a third pattern of the confidence degree calculated based on a change of a detection status of the object image over time, and
the third pattern being determined to be high when the detection status is stable over a plurality of frames, and being determined to be low when the detection status fluctuates over the plurality of frames.

10. The object recognition device according to claim 1, wherein
the object recognition device is mounted in a vehicle having a front bumper and a rear bumper,
the at least one sensor unit includes:
  a first sensor unit attached to one side of the front bumper;
  a second sensor unit attached to another side of the front bumper;
  a third sensor unit attached to one side of the rear bumper; and
  a fourth sensor unit attached to another side of the rear bumper,
each of the first to fourth sensor units comprising:
  a transmitter configured to emit the transmission signal having a predetermined wavelength;
  a receiver configured to receive the reflected signal of the transmission signal; and
  a sensor controller configured to control emission of the transmission signal from the transmitter in synchronization with frames.

11. The object recognition device according to claim 2, wherein
a first pattern of the confidence degree is calculated based on a positional relationship between a position of the object image and a detected stationary object, and
the first pattern is determined to be high when the position of the object image is located in a region that is not visually obstructed by the stationary object, and is determined to be low when the position of the object image is located in a region that is visually obstructed by the stationary object.

12. The object recognition device according to claim 2, wherein
a second pattern of the confidence degree is calculated based on a predicted ghost location estimated using a position of a detected stationary object and a motion vector derived from changes in a position of the object image, and
the second pattern is determined to be high when the position of the object image does not correspond to the predicted ghost location, and is determined to be low when the position of the object image corresponds to the predicted ghost location.

13. The object recognition device according to claim 2, wherein
the specific confidence degree is a third pattern of the confidence degree calculated based on a change of a detection status of the object image over time, and
the third pattern being determined to be high when the detection status is stable over a plurality of frames, and being determined to be low when the detection status fluctuates over the plurality of frames.

14. The object recognition device according to claim 2, wherein
the object recognition device is mounted in a vehicle having a front bumper and a rear bumper,
the at least one sensor unit includes:
  a first sensor unit attached to one side of the front bumper;
  a second sensor unit attached to another side of the front bumper;
  a third sensor unit attached to one side of the rear bumper; and
  a fourth sensor unit attached to another side of the rear bumper,
each of the first to fourth sensor units comprising:
  a transmitter configured to emit the transmission signal having a predetermined wavelength;
  a receiver configured to receive the reflected signal of the transmission signal; and
  a sensor controller configured to control emission of the transmission signal from the transmitter in synchronization with frames.

* * * * *